Patented Oct. 7, 1947

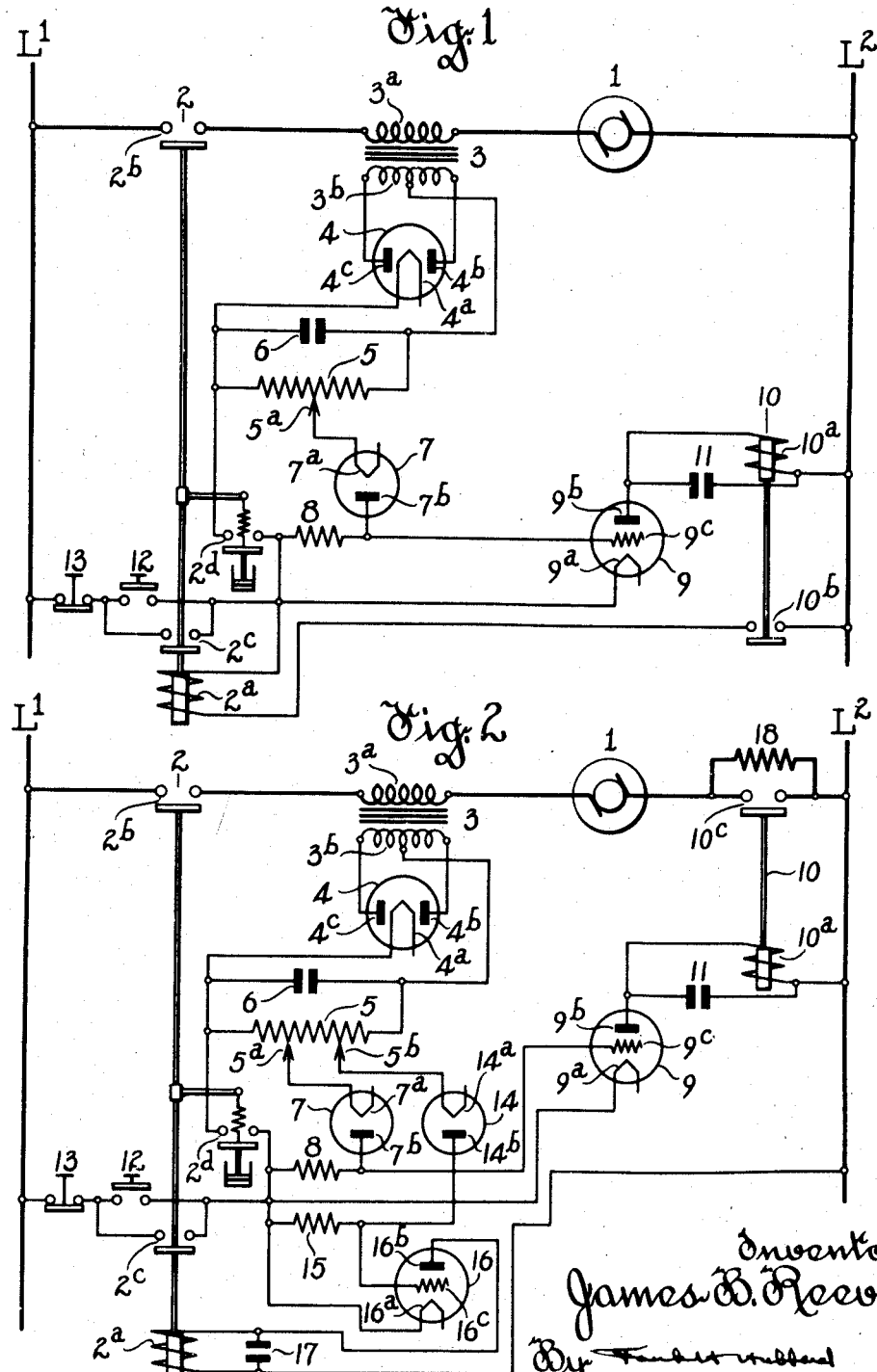

2,428,723

UNITED STATES PATENT OFFICE 2,428,723

ELECTRIC MOTOR TORQUE CONTROLLER

James B. Reeves, Whitefish Bay, Wis., assignor to Cutler-Hammer, Inc., Milwaukee, Wis., a corporation of Delaware Application July 5, 1945, Serial No. 603,351

7 Claims. (Cl. 172—274)

1

The invention relates to control of alternating current motors and is particularly applicable to systems wherein a motor may be subjected to load exceeding its capacity or wherein the torque exerted by a motor is to be limited and where the supply of motor current is to be interrupted or reduced when a predetermined torque is attained.

An object of the invention is to provide a controller which limits the running torque of an alternating current motor.

Another object is to provide a controller which interrupts the current supplied to an alternating current motor when the torque thereof rises to a given value.

Another object is to provide a controller for starting an alternating current motor and for disconnecting the same from the line when, after the motor has come up to speed, the torque of the motor rises to a certain value.

Another object is to provide a controller for an alternating current motor which affords starting thereof by impressing upon the motor full line voltage, but which after the motor has started, reduces said voltage if the motor load exceeds a given value.

Another object is to provide for deenergization of an alternating current motor after starting if the running load reaches a given value.

Another object is to provide a controller which limits the maximum running torque of an alternating current motor.

Another object is to provide electronic means for limiting the maximum running torque of an alternating current motor.

Another object is to provide electronic means for deenergizing an alternating current motor upon the running torque thereof tending to exceed a given value.

Other objects and advantages will hereinafter appear.

The accompanying drawings illustrate two embodiments of the invention.

In the drawing,

Figure 1 shows a system for starting an alternating current motor by impressing thereon full line voltage and for deenergizing the motor if the running current tends to rise above a given value, while Fig. 2 shows a modification of the system of Fig. 1, in which upon increase of the running current to a certain value, the impedance of the motor circuit is increased, and if thereafter the current should again increase, the motor is deenergized.

2

Referring to Fig. 1 of the drawing, the same is a diagrammatic illustration of a system incorporating the invention.

In the drawing, $L^1$ and $L^2$ are the bus bars of an alternating current supply system for supplying a motor 1 with current. An electromagnetic main switch 2 controls the continuity of current supply to the motor. The main switch 2 has an energizing winding $2^a$, normally open main contacts $2^b$, normally open auxiliary contacts $2^c$ and normally open contacts $2^d$, which close with a time delay. The contacts $2^b$ complete a circuit from bus bar $L^1$ through the primary winding $3^a$ of a current transformer 3 to one terminal of the motor 1. The second motor terminal is connected to the bus bar $L^2$. The transformer 3 has a center tapped secondary winding $3^b$. The end terminals of the secondary winding $3^b$ are connected to the anodes $4^b$ and $4^c$, respectively, of a full wave rectifier 4 which is provided with a cathode $4^a$. The cathode $4^a$ is connected to the center tap of the winding $3^b$, through a potential divider 5 having a movable contact $5^a$. A smoothing condenser 6 is connected in parallel with the potential divider 5. The movable contact $5^a$ of the potential divider is connected to the cathode $7^a$ of a gaseous rectifying tube 7, the anode $7^b$ of which is connected through a resistor 8 to the bus bar $L^1$ and also through contact $2^d$ to the center tap of the transformer winding $3^b$. A further connection extends from the right hand terminal of resistor 8 to the control electrode $9^c$ of an electron tube 9, which has a cathode $9^a$ and an anode $9^b$. The cathode $9^a$ is connected to the right hand terminal of the contact $2^c$, while the anode $9^b$ is connected in series with the energizing winding $10^a$ of an electromagnetic relay 10, to the bus bar $L^2$. The relay 10 is provided with normally open contacts $10^b$, engageable to connect one terminal of winding $2^a$ to bus bar $L^2$. Connected in parallel with the winding $10^a$ is a smoothing condenser 11. To initiate operation the system is provided with a normally open push button switch 12 connected in series with a normally closed push button switch 13, said switches controlling a connection between the terminals of the winding $2^a$ and bus bar $L^1$. The contacts $2^c$ parallel the contacts of push button switch 12, thus providing a holding circuit for the coil $2^a$.

The system illustrated in Fig. 1 functions in the following manner: When the bus bars $L^1$, $L^2$ are energized and it is desired to start the motor the push button switch 12 is operated thereby completing a circuit from bus bar $L^1$, through the switches 13 and 12, the tube 9 and winding 10$^a$ to line L$^2$. The relay 10 responds to close contacts 10$^b$ which completes another circuit from L$^1$, through switches 12 and 13, the energizing winding 2$^a$, the contacts 10$^b$ to bus bar L$^2$. The electromagnetic switch 2$^b$ responds and closes its own holding circuit through the contacts 2$^c$. At the same time the contacts 2$^b$ are closed thereby energizing the motor and the same revolves. The current in the motor circuit passing through the winding 3$^a$ induces a voltage in the secondary transformer winding 3$^b$, which voltage is rectified and causes a flow of current which produces a potential drop in the resistor 5. This voltage drop is proportional to the motor current flowing in the winding 3$^a$. The timing of the contacts 2$^d$ is so adjusted that the motor is accelerated and its inrush current is reduced to the normal running current or less, before the contacts 2$^d$ close. When the contacts 2$^d$ are closed, a fraction of the voltage impressed upon the resistor 5 and determined by the adjustment of contact 5$^a$ is impressed through the contacts 2$^d$ and the resistor 8 upon the tube 7. This voltage is normally insufficient to cause conduction of the tube. However, if an increase in the motor load causes the motor current to increase, the latter ultimately reaches a value which results in a voltage across the electrodes of the tube 7, to cause current conduction through the gaseous tube. The current flowing through the tube and the resistor 8 produces a voltage drop in the resistor which renders the control electrode 9$^c$ of tube 9 negative with respect to the cathode 9$^a$. The negative potential is of such value as to render the tube 9 non-conducting, thereby deenergizing the relay winding 10$^a$ and opening the contacts 10$^b$. This in turn deenergizes the energizing winding 2$^a$ to open contacts 2$^b$ which disconnects the motor 1 from the line. To restart the motor it will again be necessary to push the push button switch 12 and repeat the operation as described.

If at any time during operation of the motor it is desired to stop the same, the push button switch 13 may be depressed to deenergize the winding 2$^a$ and thus disconnect the motor. The value of motor current at which the relay 10 is deenergized to stop the motor, may be adjusted by adjustment of the contact 5$^a$.

The system illustrated in Fig. 2 is similar to the system, Fig. 1, except with the following modifications and additions. The normally open contacts 10$^b$ of the electromagnetic relay 10 of Fig. 1 is omitted and said relay is provided with a normally open contact 10$^c$ which is inserted between the right hand terminal of the motor 1 and the line L$^2$. The voltage divider 5 is provided with a second adjustable contact 5$^b$, which is connected in series with a gaseous rectifying tube 14, similar to the tube 7, and a resistor 15 to the right hand terminal of the contacts 2$^c$. One terminal of the electromagnetic winding 2$^a$ is connected to the anode 16$^b$ of an electron tube 16 while the cathode 16$^a$ of said tube is connected to the right hand terminal of contacts 2$^c$. The electron tube 16 has a control electrode 16$^c$ which is connected to the common terminal of the gaseous tube 14 and the resistor 15. A smoothing condenser 17 is connected across the terminals of the electromagnetic winding 2$^a$. A resistor 18 is connected in parallel with the normally open contacts 10$^c$ of the electromagnetic relay 10.

The system illustrated in Fig. 2 functions as follows: When the bus bars L$^1$, L$^2$ are energized and it is desired to start the motor, the push button switch 12 is depressed thereby completing a circuit from bus bar L$^1$, through the switches 13 and 12, the tube 9 and the winding 10$^a$ to line L$^2$. The electromagnetic relay 10 therefore responds to short circuit the resistor 18. Another circuit extends from line L$^1$ through the switches 13 and 12, the tube 16, the winding 2$^a$ to the line L$^2$. The switch 2 therefore also responds and closes its own hold circuit through the contacts 2$^c$. At the same time the contacts 2$^b$ are closed thereby completing a circuit from line L$^1$, through contacts 2$^b$, the winding 3$^a$, the motor 1, the contacts 10$^c$ to line L$^2$, thereby energizing the motor and the same accelerates. The current in the motor circuit passing through the winding 3$^a$ induces a voltage in the secondary transformer winding 3$^b$, which voltage is rectified and causes a flow of current through the resistor 5. The voltage across the resistor is proportional to the motor current flowing through the winding 3$^a$. The timing of the contacts 2$^d$ is so adjusted that the motor is accelerated and its inrush current is reduced to the normal running current or less before the contact 2$^d$ closes. When the contacts 2$^d$ close, a fraction of the voltage impressed upon the resistor 5 and determined by the adjustment of the contacts 5$^a$ and 5$^b$ is impressed upon the tubes 7 and 14 and the resistors 8 and 15, respectively. These voltages are normally insufficient to cause conduction of the respective tubes. However, if an increase in the motor load causes the motor current to increase, the voltage impressed upon the tube 7 increases to render said tube conducting. The current flowing through the tube 7 and the resistor 8 produces a voltage drop in the resistor 8 which renders the control electrode 9$^c$ of tube 9 negative with respect to the cathode 9$^a$. The negative potential is of such value as to render the tube 9 non-conducting, thereby deenergizing the winding 10$^a$ and opening the contacts 10$^c$. This inserts the resistor 18 in the motor circuit which causes a reduction of the motor current and of the motor torque.

If the motor current thereupon should again increase the voltage through the resistor 5 will again increase to a value which will ultimately render the tube 14 conducting, thereby causing a current to flow through the resistor 15 which will impress a potential on the grid 16$^c$ of such a value as to render the tube 16 non-conducting, thereby deenergizing the winding 2$^a$ and opening the contacts 2$^b$ to disconnect the motor 1 from the line. The motor will then remain disconnected until the push button switch 12 is again depressed to restart the motor.

While the systems described embody the control of single phase motors, the invention is obviously also applicable to polyphase motors. Furthermore, the impedance shown in Fig. 2 may be divided into several sections, each section being controlled by its individual electromagnetic relay and cooperating elements described and claimed.

The invention may obviously also be employed to control the current supply to translating circuits other than motors.

I claim:

1. In combination, a source of alternating current, an alternating current motor, a transformer having a primary winding and a secondary winding, a resistor, a rectifier connected to said secondary winding and said resistor to rectify the current induced in said secondary winding and supply said rectified current to said resistor, an impedance, an electromagnetic switch energizable to connect said motor, said primary winding and said impedance in series to said source, an electromagnetic relay energizable to short circuit said impedance, a pair of normally conducting electron tubes controlling the energization of said switch and of said relay respectively, means to initiate energization of said electromagnetic switch and of said relay, means to render continued energization of said electromagnetic switch and of said electromagnetic relay independent of said initiating means, a plurality of means each including a gaseous discharge tube to be influenced by a selective portion of voltage drop in said resistor, said plurality of means being progressively responsive to render said electron tubes non-conducting thereby to deenergize said switch and said relay automatically, if the total voltage drop in said resistor progressively increases to a given value, and means responsive to operation of said switch to subject said gaseous discharge tubes to the influence of said voltage drop but only after a given time interval.

2. In combination, a source of alternating current, an electric motor, a transformer having a primary winding and a secondary winding, an electromagnetic switch energizable to connect said motor and said primary winding in series relation to said source, means to energize said switch and to maintain it energized to effect starting and continued operation of said motor, said means comprising an electron tube which when rendered nonconducting effects deenergization of said switch, and means effective subject to a predetermined time delay following initial energization of said switch to render said electron tube nonconducting under given conditions, the last mentioned means comprising a resistor in series relation to said secondary transformer winding, a gaseous discharge tube which is under the influence of a voltage drop in said resistor and which when said voltage drop exceeds a given value becomes conductive to render said electron tube nonconducting.

3. In combination, a source of alternating current, an electric motor, a transformer having a primary winding and a secondary winding, an electromagnetic switch energizable to connect said motor and said primary winding in series relation to said source, means to energize said switch and to maintain it energized to effect starting and continued operation of said motor, said means comprising an electron tube which when rendered nonconducting effects deenergization of said switch, and means effective subject to a predetermined time delay following initial energization of said switch to render said electron tube nonconducting under given conditions, the last mentioned means comprising a resistor in series relation to said secondary transformer winding, a gaseous discharge tube, a time element switch operable by said electroresponsive switch and a circuit controlled by said time element switch to place said gaseous discharge tube under the influence of a voltage drop in said resistor to cause said gaseous discharge tube to become conducting when said voltage drop exceeds a given value.

4. In combination, a source of alternating current, an alternating current motor, a transformer having a primary winding and a secondary winding, an electromagnetic switch energizable to connect said motor and said primary transformer winding in series relation to said source, means to energize said switch and to maintain it energized to effect starting and continued operation of said motor, said means comprising an electroresponsive relay and an electron tube through the medium of which said relay is energizable to energize said switch and which when rendered nonconducting effects deenergization of said relay to deenergize said switch, and means effective subject to a predetermined time delay following initial energization of said switch to render said electron tube nonconducting under given conditions, the last mentioned means comprising a resistor in series relation to said secondary transformer winding, a gaseous discharge tube which is under the influence of a voltage drop in said resistor and which when said voltage drop exceeds a given value becomes conductive to render said electron tube nonconducting for release of said relay.

5. In combination, a source of alternating current, an alternating current motor, a transformer having a primary winding and a secondary winding, a resistor connected in series with said secondary transformer winding, an impedance, means to connect said motor, said primary transformer winding and said impedance in series to said source, means to short circuit said impedance and control means for the first and second mentioned means comprising gaseous discharge tubes which when rendered conductive respectively effect inclusion of said impedance by the second mentioned means and disconnection of the motor by the first mentioned means, and said control means also comprising means effective subject to a predetermined time delay following initial connection of said motor to said source to subject said gaseous tubes to influence of selected voltage drops in said resistor whereby said gaseous tubes are rendered conducting progressively when the total voltage drop in said resistor progressively increases to a given value.

6. In combination, a source of alternating current, an alternating current motor, a transformer having a primary winding and a secondary winding, a resistor connected in series with said secondary winding, an impedance, an electromagnetic switch energizable to connect said motor, said primary winding and said impedance in series to said source, an electromagnetic relay energizable to short circuit said impedance and control means for said switch and said relay comprising gaseous discharge tubes which when rendered conductive respectively effect deenergization of said relay and of said switch, and said control means also comprising means effective subject to a predetermined time delay following initial connection of said motor to said source to subject said gaseous tubes to influences of selected voltage drops in said resistor whereby said gaseous tubes are rendered conducting progressively when the total voltage drop in said resistor progressively increases to a given value.

7. In combination, a source of alternating current, an alternating current motor, a transformer having a primary winding and a secondary winding, a resistor connected in series with said secondary winding, an impedance, an electromagnetic switch energizable to connect said motor, said primary winding and said impedance in series to said source, an electromagnetic relay energizable to short circuit said impedance, a normally conducting electron tube in circuit with an energizing winding of said switch, a normally conducting electron tube in circuit with an energizing circuit of said relay and control means for said electron tubes comprising gaseous discharge tubes which are respectively associated with said electron tubes and which when rendered conductive block current conduction through their respective electron tubes, said last mentioned means also comprising means subject to a predetermined time delay following initial connection of said motor to said source to subject said gaseous tubes to influences of selected voltage drops in said resistor whereby said gaseous tubes are rendered conducting progressively when the total voltage drop in said resistor progressively increases to a given value.

JAMES B. REEVES.

REFERENCES CITED

The following references are of record in the file of this patent:

UNITED STATES PATENTS

| Number | Name | Date |
|---|---|---|
| 1,199,936 | Simon | Oct. 3, 1916 |
| 1,354,708 | Whittingham | Oct. 5, 1920 |
| 1,817,486 | Hester | Aug. 4, 1931 |
| 1,871,787 | Goldsborough | Aug. 16, 1932 |
| 2,295,297 | Schneider | Sept. 8, 1942 |